US008472083B2

(12) United States Patent
Arakawa et al.

(10) Patent No.: US 8,472,083 B2
(45) Date of Patent: Jun. 25, 2013

(54) INTRA PREDICTION APPARATUS AND INTRA PREDICTION METHOD USING FIRST BLOCKS OBTAINED BY DIVIDING A PICTURE AND SECOND BLOCKS OBTAINED BY DIVIDING THE FIRST BLOCK

(75) Inventors: Hiroshi Arakawa, Kashiba (JP); Koji Arimura, Hirakata (JP); Tatsuro Juri, Osaka (JP); Takashi Masuno, Hirakata (JP); Kei Tasaka, Ikoma (JP)

(73) Assignee: Panasonic Corporation, Osaka (JP)

( * ) Notice: Subject to any disclaimer, the term of this patent is extended or adjusted under 35 U.S.C. 154(b) by 1465 days.

(21) Appl. No.: 11/299,740

(22) Filed: Dec. 13, 2005

(65) Prior Publication Data

US 2006/0126730 A1     Jun. 15, 2006

(30) Foreign Application Priority Data

Dec. 13, 2004   (JP) ................................. 2004-360541

(51) Int. Cl.
*G06T 5/00*        (2006.01)

(52) U.S. Cl.
USPC ..... 358/3.26; 358/3.22; 358/1.9; 375/240.03; 375/240.18; 375/240.29; 375/236; 375/269; 382/275; 382/236; 382/269; 345/607

(58) Field of Classification Search
USPC .................. 375/240.03, 240.18, 240.29, 236, 375/275, 269; 358/3.26, 1.9, 3.22; 382/275, 382/236, 269; 345/607
See application file for complete search history.

(56) References Cited

U.S. PATENT DOCUMENTS

| 5,054,103 | A  | 10/1991 | Yasuda et al. |
| 6,556,625 | B2 | 4/2003  | Haskell et al. |
| 7,099,390 | B2 | 8/2006  | Kajita |
| 2003/0123548 | A1* | 7/2003 | Kajita ..................... 375/240.13 |

(Continued)

FOREIGN PATENT DOCUMENTS

| JP | 64-082768 | 3/1989 |
| JP | 2003-199111 | 7/2003 |

(Continued)

OTHER PUBLICATIONS

Japanese Office Action issued in Japanese Patent Application No. JP 2004-360541 dated Mar. 16, 2010.

(Continued)

*Primary Examiner* — Benny Q Tieu
*Assistant Examiner* — Martin Mushambo
(74) *Attorney, Agent, or Firm* — McDermott Will & Emery LLP

(57) ABSTRACT

To provide an intra prediction apparatus which can circumvent a hazard problem and improve the time reduction effect. An intra prediction apparatus 11 performs intra predictions of a picture. The intra predictions include: second intra predictions of respective second blocks (blocks) which are obtained by dividing a first pixel block; and a first intra prediction of the first block (macroblock) which constitutes the picture. The intra prediction apparatus 11 includes: an intra prediction unit (a prediction unit 113, an orthogonal transform and quantization unit 115, an inverse orthogonal transform and inverse quantization unit 116, and an adder 117) which performs the intra predictions; and a control unit 119 which controls the intra prediction unit to perform in parallel the intra prediction of the macroblock and the intra predictions of the respective pixel blocks.

10 Claims, 16 Drawing Sheets

U.S. PATENT DOCUMENTS

| | | | |
|---|---|---|---|
| 2003/0156648 A1* | 8/2003 | Holcomb et al. | 375/240.18 |
| 2003/0206594 A1 | 11/2003 | Zhou | |
| 2004/0008771 A1 | 1/2004 | Karczewicz | |
| 2004/0028282 A1* | 2/2004 | Kato et al. | 382/236 |
| 2004/0233989 A1* | 11/2004 | Kobayashi et al. | 375/240.16 |
| 2004/0264572 A1* | 12/2004 | Sato et al. | 375/240.16 |
| 2005/0089094 A1* | 4/2005 | Yoo et al. | 375/240.12 |
| 2005/0089235 A1* | 4/2005 | Sakaguchi et al. | 382/239 |

FOREIGN PATENT DOCUMENTS

| | | |
|---|---|---|
| JP | 2004-140473 | 5/2004 |
| JP | 2004-140473 A | 5/2004 |
| WO | WO 03/026315 A1 | 3/2003 |

OTHER PUBLICATIONS

Japanese Office Action issued in Japanese Patent Application No. JP 2004-360541 dated Sep. 29, 2009.

"H.264 Advanced Video Coding for Generic Audiovisual Services," International Telecommunication Union, May 2003, pp. 97-107.

"H.264 AVC Textbook," Impress Standard Textbook Series, Jul. 2004, pp. 106-113, Japanese publication (w/ English translation).

Huang, Yu-Wen et al.: "Analysis, Fast Algorithm, and VLSI Architecture Design for H.264/AVC Intra Frame Coder," IEEE Transactions on Circuits and Systems for Video Technology, vol. 15, No. 3, Mar. 2003, pp. 378-401.

* cited by examiner

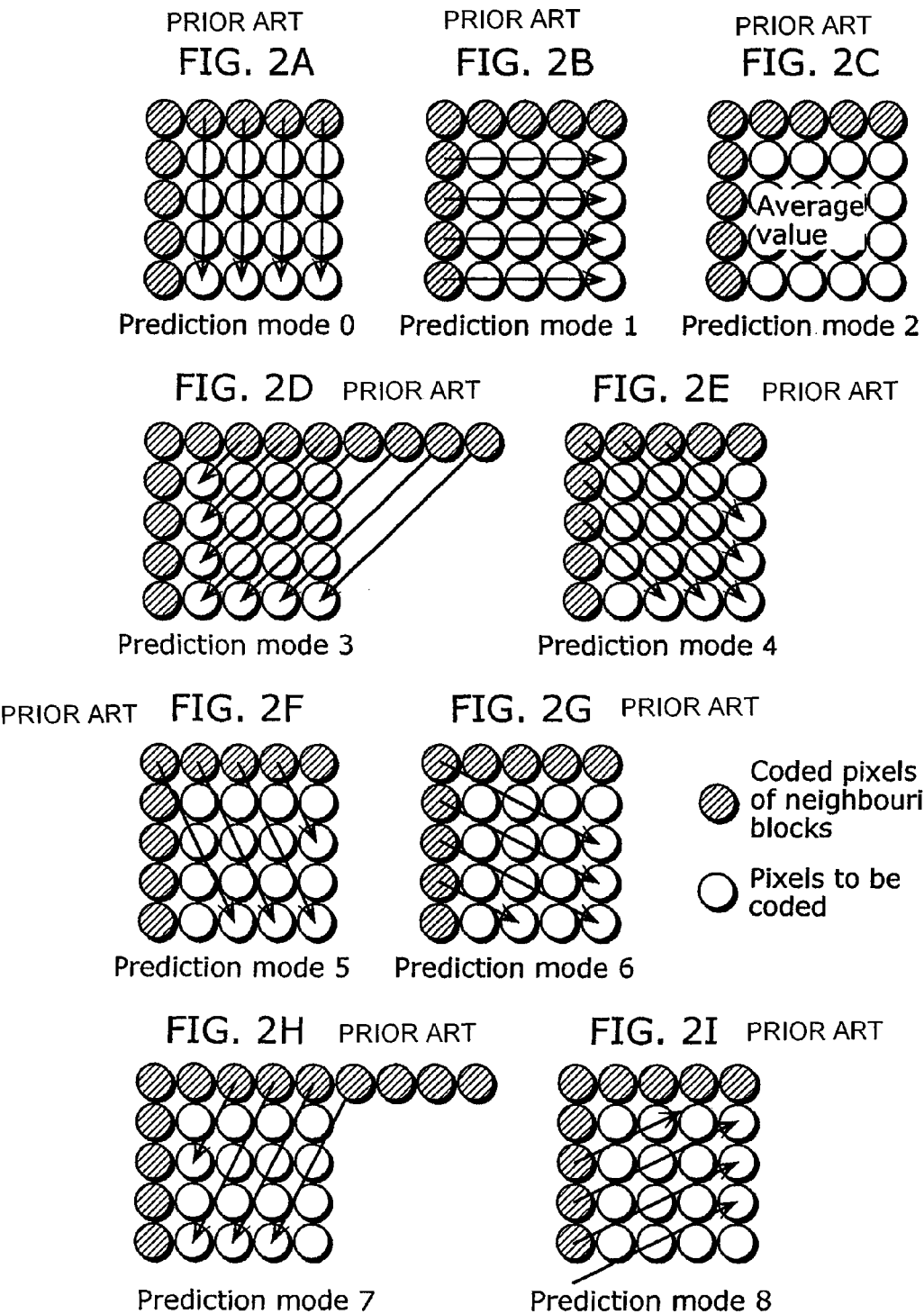

Prediction mode 0
(Vertical prediction)

Prediction mode 1
(Horizontal Prediction)

Prediction mode 2
(DC prediction)

Prediction mode 3
(Plane prediction)

◎ Coded pixels positioned above or left

○ Pixels to be coded

Block 2

Block 3

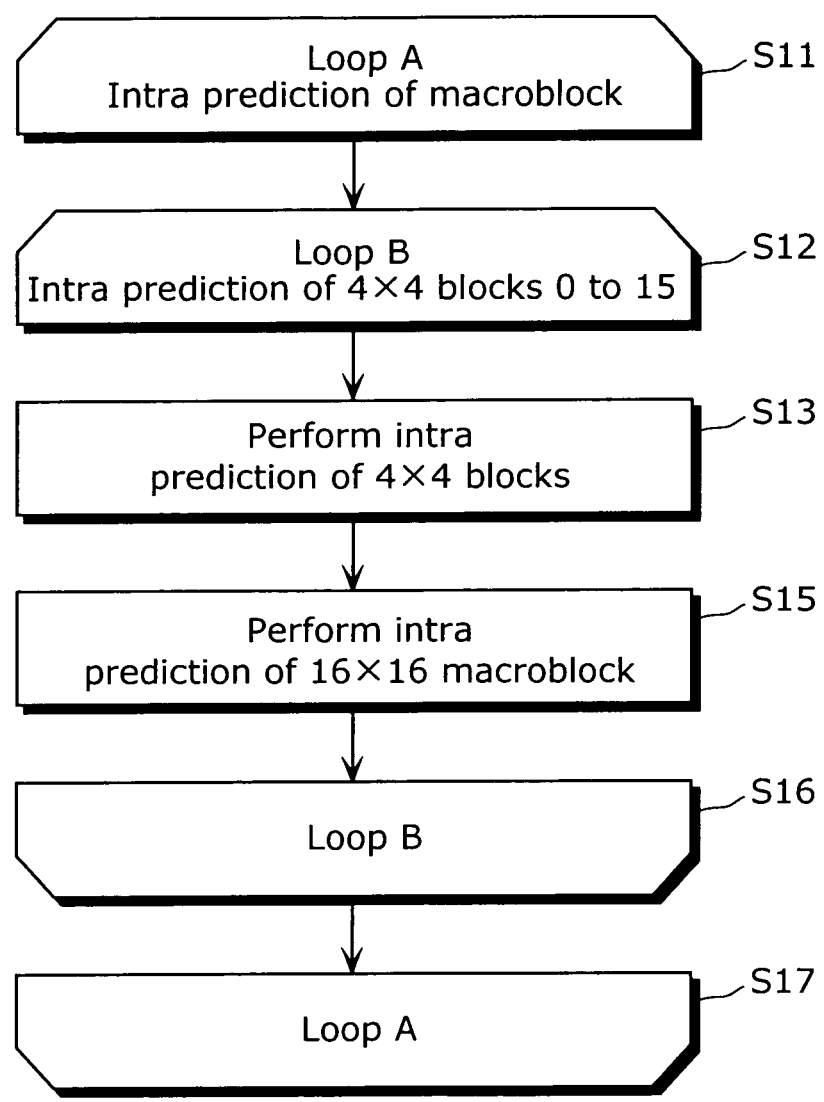

FIG. 12A Position information of block

FIG. 12B Control information S

FIG. 12C Address information

FIG. 12D Prediction processing
| Block 0 4×4 | Block 0 16×16 | Block 1 4×4 | Block 1 16×16 | Block 2 4×4 | Block 2 16×16 |

FIG. 12E Orthogonal transform and quantization processing

FIG. 12F Inverse orthogonal transform and inverse quantization processing

FIG. 12G Inverse prediction processing

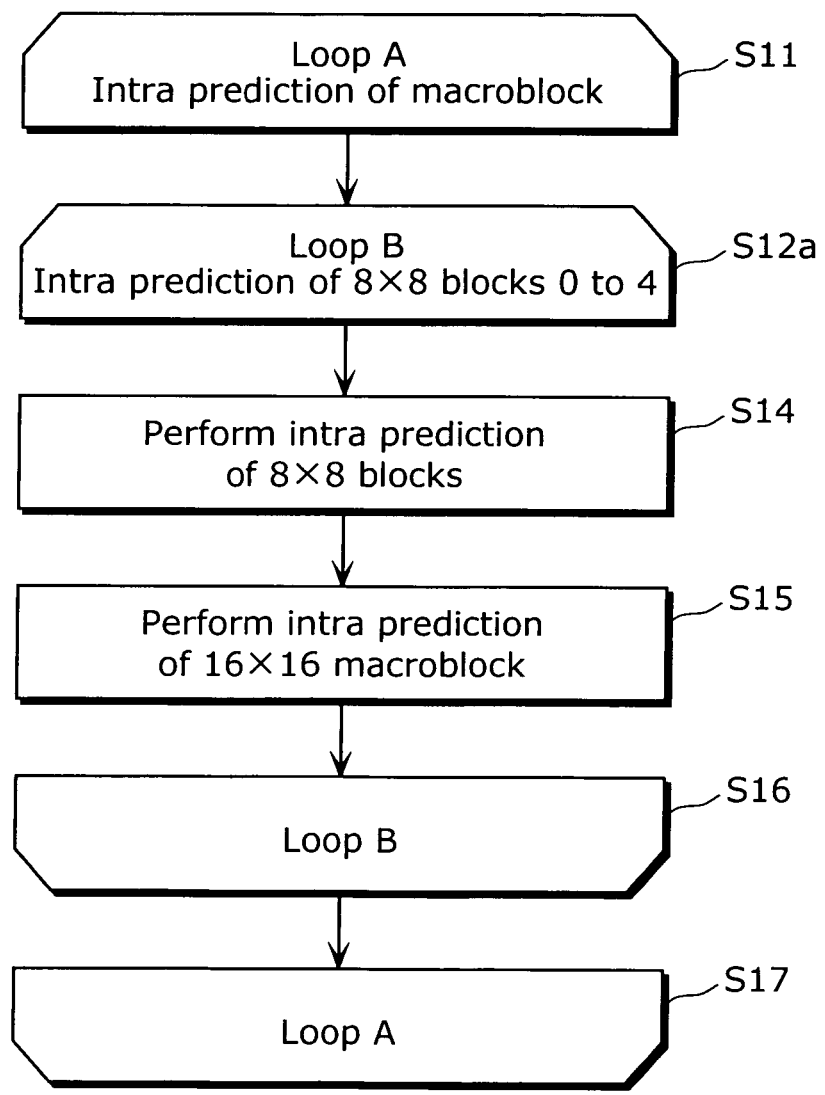

INTRA PREDICTION APPARATUS AND INTRA PREDICTION METHOD USING FIRST BLOCKS OBTAINED BY DIVIDING A PICTURE AND SECOND BLOCKS OBTAINED BY DIVIDING THE FIRST BLOCK

BACKGROUND OF THE INVENTION (1) Field of the Invention

The present invention relates to an intra prediction apparatus in video coding and an intra prediction method, and particularly to a technique for improving the efficiency in the intra prediction coding in H.264 or the like.

(2) Description of the Related Art

Recent years have seen the widespread use of broadband communication infrastructures or the like and the reduction in prices of storage devices with a large capacity such as personal computers, HDDs and DVDs, and additionally memory cards. This has created an environment where general consumers edit, store, distribute and carry video, and the number of such users is further increasing.

Today, general consumers handle video in a great number of scenes. However, there remain cases where a sufficient performance is not provided in handling video although the performance of a personal computer has been improved in these days. For example, since the information amount of video is very large, it still takes a lot of time to compress moving pictures even with a high-performance personal computer. A conceivable solution to this problem is to improve the operation efficiency, in other words, to reduce the number of operations maintaining the coding performance. In addition, performing highly efficient operations leads to reducing electric power consumption and easing time constraints in video recording which depends on a battery status of a portable video recorder. In these circumstances, the need for a highly efficient moving picture compression technique has been further increasing.

Such being the case, the H.264 Standard which is an international standard for moving picture compression was newly born. An object of H.264 is to improve picture quality and coding efficiency. For this purpose, plural moving picture compression tools are used in H.264. In addition, H.264 has features of comparing plural prediction methods in sequence, selecting one prediction methods with an excellent coding efficiency from among the prediction methods, and performing coding according to the selected methods.

In an example case of performing coding in a 16×16 pixel macroblock included in an I picture shown in FIG. 1, the following intra prediction coding is performed in parallel: an intra prediction coding of each 4×4 pixel block which is one of the 16 segments obtained by dividing the 16×16 macroblock in one of the plural directions; and an intra prediction coding of the macroblock in plural directions.

In a representative 4×4 intra prediction, the most efficient prediction method is selected by comparing plural prediction methods.

As shown in FIG. 2, there are nine prediction modes including eight directional prediction modes and one undirectional prediction mode. The eight directional prediction modes are: (a) a prediction mode 0 (vertical) for calculating prediction pixel values based on the macroblock positioned above the current macroblock and predicting pixel values in the vertical direction; (b) a prediction mode 1 (horizontal) for calculating prediction pixel values based on the neighbouring macroblock and predicting pixel values in the horizontal direction; (c) a prediction mode 8 (horizontal-up) for calculating prediction pixel values from the neighbouring macroblock and predicting pixel values in the direction inclined by +22.5 degrees from the horizontal direction; (d) a prediction mode 6 (horizontal-down) in the direction inclined by −22.5 degrees from the horizontal direction; (e) a prediction mode 4 (diagonal-down-right) in the direction inclined by −44.5 degrees from the horizontal direction; (f) a prediction mode 5 (vertical-right) for calculating prediction pixel values obtained based on the neighbouring macroblock and predicting pixel values in the direction inclined by +22.5 degrees from the vertical direction; (g) a prediction mode 7 (vertical-left); and a prediction mode 3 (diagonal-down-left) in the direction inclined by −22.5 degrees from the vertical direction; and (h) a prediction mode 3 (diagonal-down-left) in the direction inclined by −44.5 degrees from the vertical direction. Additionally, the undirectional prediction mode is a prediction mode 2 (DC) for predicting pixel values based on the mean values of pixel vales of the neighbouring macroblocks.

Likewise, there are plural prediction methods in a 16×16 intra prediction. There are four prediction methods of a kind in this 16×16 intra prediction.

As shown in FIG. 3, 16×16 intra prediction methods are: a prediction mode 0 (vertical); a prediction mode 1 (horizontal); a prediction mode 2 (DC); and a prediction mode 3 (Plane).

For this reason, as shown in FIG. 4, a conventional intra prediction apparatus calculates a prediction error (Sum of Absolute Difference: SAD) of Block 0 according to each of the nine prediction modes in response to the input of an I picture. In other words, a conventional intra prediction apparatus calculates all of the difference values between the reference pixels and the pixels to be coded and the SADs according to the nine prediction modes. After that, the intra prediction apparatus employs the optimum prediction mode which can provide the smallest prediction error as the optimum intra prediction method. Note that the SADs may be calculated after an orthogonal transform is performed on the difference values, in other words, after the difference values are transformed into frequency components.

After the intra prediction of Block 0 is completed, the intra prediction apparatus repeats the same processing, and performs intra predictions of Blocks 1 to 15.

After the intra prediction of Block 15 is completed, the conventional intra prediction apparatus calculates all of the difference values between the reference pixels and the pixels to be coded in the macroblock and the SADs according to the four prediction modes. After that, the intra prediction apparatus uses the smallest prediction error such as one of the following in order to perform the intra prediction: the total of the SADs of the respective blocks; and the SAD of the macroblock. In other words, in the case where the total of the SADs of the respective blocks is the smallest, the intra prediction apparatus outputs the total of the SADs of the respective blocks. In the other case where the SAD of the macroblock is the smallest, the intra prediction apparatus outputs the difference values of the macroblock. In this way, the data of an I picture is compressed.

However, as described above, it takes a lot of time for a conventional intra prediction apparatus to complete the intra prediction of the 4×4 pixel blocks and the intra prediction of the 16×16 pixel block using the intra prediction of the H.264 Standard which is a laid-open international video compression scheme. This is because prediction images are created according to plural prediction methods (nine intra prediction modes for 4×4 pixel blocks, and four intra prediction modes for 16×16 pixel blocks) in order to improve picture quality, and the process of selecting the optimum prediction mode from among the various prediction modes is performed in sequence, in other words, the process of selecting the mode with a high coding efficiency based on the calculation results is performed in sequence.

In other words, in the intra prediction for 4×4 pixel blocks among the intra prediction schemes of the H.264 Standard, the following processes of calculating pixel values of a picture to be reproduced are performed in the order shown in FIG. 1: (a) calculating the differences between the coded pixel values and the pixel values to be coded in the 4×4 blocks according to the respective prediction modes intended for calculating the differences in different directions; (b) determining the prediction mode to be employed which can provide the smallest SAD from among the prediction modes; (c) calculating quantization coefficients by performing an orthogonal transform or a quantization of the difference values between the coded pixel values and the pixel values to be coded according to the determined prediction mode; and (d) performing an inverse intra prediction which means reproducing the difference values by performing an inverse quantization or an inverse orthogonal transform of the quantization coefficients, and then to add the reproduced difference values and the prediction pixel values. For example, since the decoded pixels of Block 2 are used in the Standard in order to perform an intra prediction of Block 3, the prediction processes must be performed in sequence as shown in FIG. 5. This means that each of the processes which are an intra prediction, an orthogonal transform, a quantization and the like cannot be performed efficiently, resulting in causing the problem that it takes a lot of time to complete the prediction processes.

Therefore, for the purpose of realizing a video compression technique which can provide high-quality pictures efficiently, there are needs today for reducing the time to perform intra prediction in H.264 because H.264 can provide high-quality pictures.

In order to solve this problem, a conventional intra prediction apparatus performs intra predictions in the order different from the order defined in the Standard, that is, the ascending order of block numbers shown in FIG. 6. This makes it possible for the conventional intra prediction apparatus to start the processing of Block 3 before starting the processing of Block 4 as shown in FIG. 7, and thus to perform the processes of an intra prediction, orthogonal a transform, and a quantization (refer to Patent Reference 1). As the result, it becomes possible to realize a pipeline operation of the processes.
Patent Reference 1: Japanese Patent Publication No. 2004-140473 (pp. 1 to 21).
Non-patent Reference 1: H.264 Advanced video coding for generic audiovisual services
(ftp://ftp.imtc-files.org/jvt-experts/2003_09_SanDiego/JVT-I050.doc)
Non-patent Reference 2: H.264/AVC TEXTBOOK, impress standard textbook series, ISBN No. 4844319833, (July 2004).

SUMMARY OF THE INVENTION

The conventional intra prediction apparatus disclosed in the above-mentioned publication can perform in parallel (a) the processes of an intra prediction, an orthogonal transform, a quantization of the 4×4 blocks efficiently and (b) a pipeline processing of the 4×4 blocks. However, for example, Blocks 2 and 3 shown in FIG. 6 cannot be processed until the blocks which are immediately before the respective blocks are decoded. This means Blocks 2 and 3 are still processed in sequence. In other words, there may occur a problem that the processing performance is deteriorated because of a pipeline hazard. A hazard like this may occur in Blocks 0, 1 and 2 to be processed early and Blocks 13, 14 and 15 to be processed later in FIG. 6.

In addition, the 16×16 macroblock is still processed in sequence, and thus the time reduction effect is still small.

Additionally, since the intra prediction of the macroblock is performed in the order which is different from the coding order defined in the Standard, there emerges another problem that an additional process for temporally storing processing results and another circuit are required.

Therefore, a first object of the present invention is to provide an intra prediction apparatus which can circumvent a hazard problem so as to improve the time reduction effect.

In addition, a second object of the present invention is to provide an intra prediction apparatus which can eliminate the additional process for temporally storing the processing results and the additional circuit.

In order to achieve the above-mentioned first object, the intra prediction apparatus, of the present invention, for performing intra predictions of a picture includes (a) an intra prediction unit which performs the intra predictions of the picture and (b) a control unit. The intra predictions include: second intra predictions of respective second blocks which are obtained by dividing a first block; and a first intra prediction of the first block which constitutes the picture. The control unit controls the intra prediction unit to perform in parallel the second intra predictions of the respective second blocks and the first intra prediction of the first block.

Since the results of intra prediction of Block 2 is not used for the intra prediction of Block 1, it is possible to perform the intra prediction of Block 1 and the intra prediction of Block 2 in parallel at the time of starting the intra prediction of Block 1. In other words, it is possible to perform intra predictions of Blocks 1 and 2 in a pipeline processing. Therefore, it becomes possible to circumvent a hazard problem so as to improve the time reduction effect.

In addition, in a first aspect of the present invention, in the intra prediction apparatus, the control unit may control the intra prediction unit to perform the first intra prediction of the first block when at least a part of processes in the second intra predictions of the respective second blocks is suspended.

In this way, it is possible to make the most of a part of the intra prediction unit effectively.

In addition, in a second aspect of the present invention, in the intra prediction apparatus, the intra prediction unit may include a prediction unit, and a coding and decoding unit which will be described below. The prediction unit (a) calculates, for each prediction direction, absolute differences between pixel values of respective pixels to be coded in the first block and prediction pixel values, (b) calculates, for each prediction direction, a sum of the absolute differences, and (c) determines a prediction mode to be employed based on the smallest sum of absolute differences. The prediction unit further (a) calculates, for each prediction direction, absolute differences between pixel values of respective pixels to be coded in the first block and prediction pixel values, (b) calculates, for each prediction direction, a sum of the absolute differences, and (c) determines a prediction mode to be employed based on the smallest sum of absolute differences. The coding and decoding unit performs the following codings which include: obtaining the differences between the coded pixel values and the pixel values to be coded; performing orthogonal transforms and quantizations of the differences so as to obtain quantization coefficients according to the prediction mode determined by the prediction unit. Further, the coding and decoding unit performs the following decodings which include: performing inverse quantizations and inverse orthogonal transforms of the obtained quantization coefficients so as to reconstruct the differences; and performing inverse intra predictions of adding the reconstructed differences and the prediction pixel values calculated by the prediction unit so as to obtain the pixel values of the pixels in the picture to be reproduced. In the intra prediction apparatus, the control unit may cause the intra prediction unit to perform the first intra prediction of the first block while the part of the second intra predictions of the respective second blocks is suspended.

In this way, it is possible to make the most of the intra prediction unit effectively.

In addition, in a third aspect of the present invention, in the intra prediction apparatus, the control unit may cause the coding and decoding unit to perform the coding processes and the decoding processes of the respective second blocks while the prediction unit is performing the first intra prediction of the first block.

In this way, it is possible not only to make the most of a coding and a decoding unit but also complete, in a short time, the coding and decoding processes for Block 2 and the intra prediction processes of Blocks 1 and 2.

In addition, in order to achieve the second object, in the first aspect of the present invention, in the intra prediction apparatus, the control unit may control the intra prediction unit to perform the second intra predictions of the respective second blocks according to a predetermined order.

In this way, it is possible to eliminate the additional process for temporally storing the processing results and the additional circuit.

In addition, in the first aspect of the present invention, in the intra prediction apparatus, the first block may be one of a 16×16 pixel block and an 8×8 pixel block, and the second block may be one of a 4×4 pixel block and an 8×8 pixel block.

In this way, it is possible to perform intra prediction with an excellent coding efficiency depending on a change rate of pixel values of images to be coded.

In addition, in the first aspect of the present invention, in the intra prediction apparatus, the control unit may cause the prediction unit to perform the first intra prediction in one or more of the following periods: a period between the second intra prediction which is first in a predetermined order and the second intra prediction which is second in the predetermined order; a period between the second intra prediction which is second in the predetermined order and the second intra prediction which is third in the predetermined order; a period between the second intra prediction which is thirteenth in the predetermined order and the second intra prediction which is fourteenth in the predetermined order; and a period between the second intra prediction which is fourteenth in the predetermined order and the second intra prediction which is fifteenth in the predetermined order.

In this way, it is possible to surely circumvent a hazard problem.

Note that the present invention can be realized not only as an intra prediction apparatus like this but also as an intra prediction method including steps which correspond to the unique units of the intra prediction apparatus and as a program causing a computer to execute these steps. Additionally, the program can be distributed through a recording medium such as a CD-ROM and a communication medium such as the Internet.

As clearly described up to point, with the intra prediction apparatus of the present invention, it becomes possible to realize a pipeline processing by performing intra predictions of 16×16 pixel blocks appropriately on the blocks for which a pipeline processing cannot be performed conventionally. Therefore, it becomes possible to circumvent a hazard problem so as to improve the time reduction effect. In addition, since the coding order is the same as the intra prediction order, no additional process for temporally storing the processing results and no additional circuit are required, and thus the intra prediction apparatus of the present invention provides advantages in the circuit scale and the electric power consumption. The present invention may be employed not only independently but also in combination with a conventional example in order to realize a further pipeline processing, and thus the present invention is highly effective.

The present invention makes it possible to perform intra predictions with an excellent coding efficiency circumventing a hazard problem so as to improve the time reduction effect. Thus, the present invention is highly practical today when intra prediction apparatuses have been widespread.

FURTHER INFORMATION ABOUT TECHNICAL BACKGROUND TO THIS APPLICATION

The disclosure of Japanese Patent Application No. 2004-360541 filed on Dec. 13, 2004 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIGS. 2A to 2I each is a diagram showing a prediction mode of the respective 4×4 pixel blocks;

FIG. 11 is a flow chart showing the operation of the prediction processes which are performed by a prediction unit 113 shown in FIG. 9;

FIGS. 12A to 12G each is a sequence diagram showing the time relationship of position information of a pixel block, address information, a control signal S and a prediction process which are the inputs in a control unit 119;

FIG. 16 is a flow chart showing the operation of still another prediction process which is performed by the prediction unit 113.

DESCRIPTION OF THE PREFERRED EMBODIMENT

The intra prediction apparatus of the embodiment in the present invention will be described with reference to figures.

Figure 8:
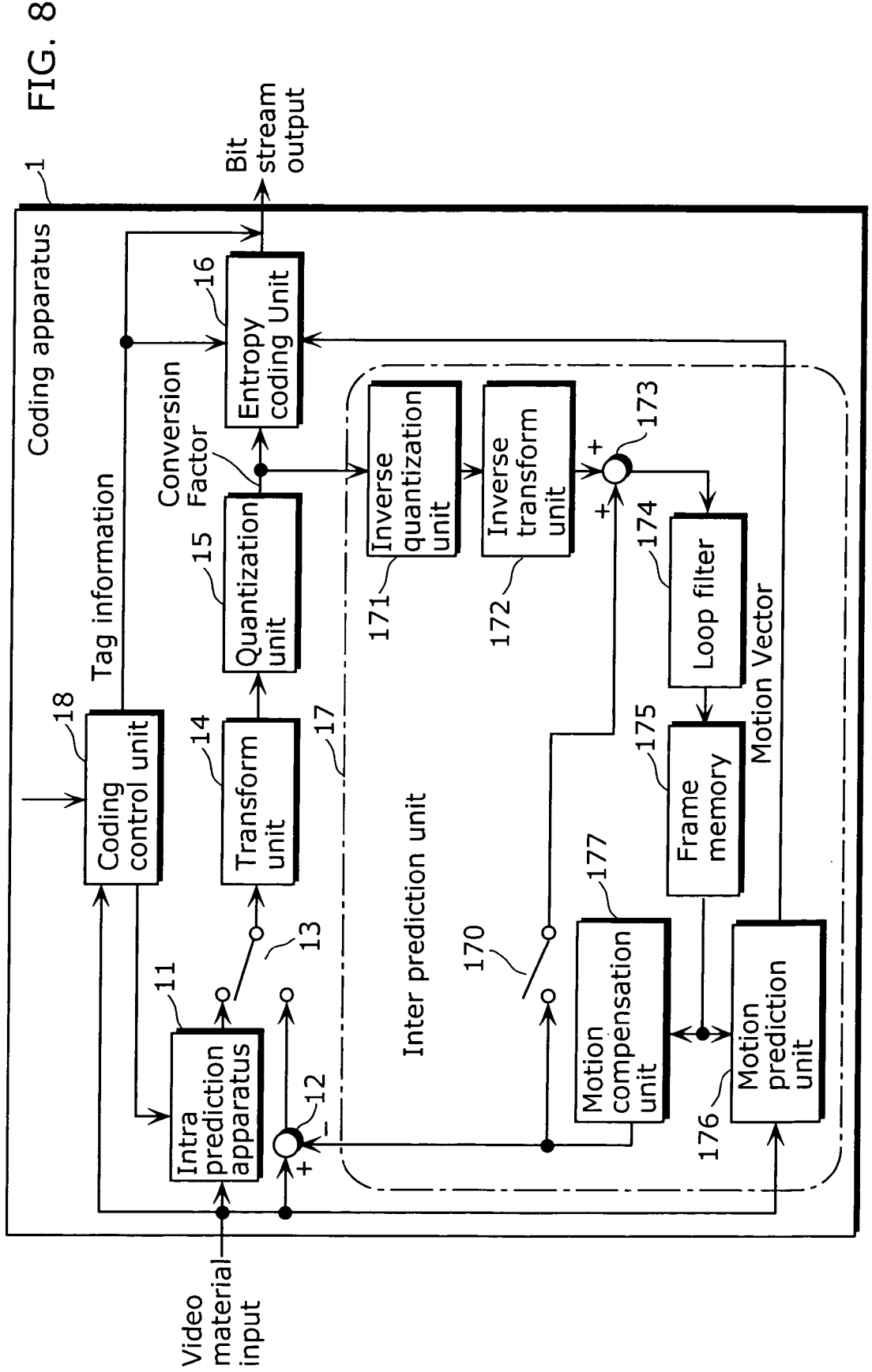
FIG. 8 is a functional block diagram showing the overall configuration of a coding apparatus 1 in which an intra prediction apparatus of the embodiment in the present invention is applied.

FIG. 8 is a functional block diagram showing the overall configuration of a coding apparatus 1 in which an intra prediction apparatus of the embodiment in the present invention is applied.

The coding apparatus 1 performs an intra prediction coding of I pictures and also performs an inter prediction coding of P pictures and B pictures. As shown in FIG. 8, the coding apparatus 1 includes: an intra prediction apparatus 11; a subtractor 12; a mode selector switch 13; a transform unit 14; a quantization unit 15; an entropy coding unit 16; an inter prediction unit 17; and a coding control unit 18. In addition, the inter prediction unit 17 is made up of: a mode selector switch 170; an inverse quantization unit 171; an inverse transform unit 172; an adder 173; a loop filter 174; a frame memory 175; a motion prediction unit 176; and a motion compensation unit 177.

As to the pictures on which an inter prediction coding is performed, each of the pictures to be coded is divided into so-called macroblocks. A macroblock is made of, for example, horizontal 16 pixels×vertical 16 pixels. The following processing of the blocks is performed on a block-by-block basis.

The subtractor 12 obtains a differential image by obtaining the difference between the picture to be coded and the prediction image signal which is an output of the motion compensation unit 177. This differential image is outputted to the transform unit 14 through a mode selector switch 13.

Residual data made up of transform coefficients are generated by means that the transform unit 14 performs the frequency transforms and the quantization unit 15 performs the quantizations of the differential image.

Decoded residual data are generated respectively by means that the inverse quantization unit 171 performs the inverse quantizations and that the inverse transform unit 172 performs the image decoding processings such as the inverse frequency transforms. The adder 173 generates reconstructed image signals by adding the decoded residual data and the prediction image signals. The obtained reconstructed image signals are subjected to the removal of distortion in blocks performed by the loop filter 174 and then stored in the frame memory 175.

On the other hand, the input image signals corresponding to the respective macroblocks which have been read out from the frame memory 175 are inputted to the motion prediction unit 176 also. Here, it is assumed that one or more coded pictures stored in the frame memory 175 are to be searched so as to detect the image area which is most similar to each input image signal. In this way, the motion vector indicating the position and the reference picture index indicating the picture selected at the time are determined. Motion vectors are detected on the basis of each block which is a segment obtained by dividing a macroblock. The motion prediction unit 176 extracts the optimum image area from the coded pictures stored in the frame memory 175 using the obtained motion vectors and reference picture index so as to generate prediction images.

The coded information such as motion vectors, reference picture indexes and coded residual signals which have been outputted in the above-described series of processes are subjected to variable length coding in the entropy coding unit 16. This coding makes it possible to output a bit stream with small data amount.

The processing flow described up to this point showed the operation in the case of performing an inter prediction coding, but inter prediction coding and an intra prediction coding are switchable using a switch 13 and a switch 170.

In the case of performing an intra coding, no prediction images based on motion compensations are generated. A difference image signal is generated by generating a prediction image in the area to be coded based on the coded image in the same picture and then calculating the difference between the prediction image and the coded image. Note that, the details will be described later. This difference image signal is transformed into coded residual data in the transform unit 14 and the quantization unit 15 like the case of an inter prediction coding, is subjected to a variable length coding in the entropy coding unit 16, and consequently, a bit stream with a small data amount is outputted.

Next, the detailed structure of the intra prediction apparatus 11 will be described.

Figure 9:
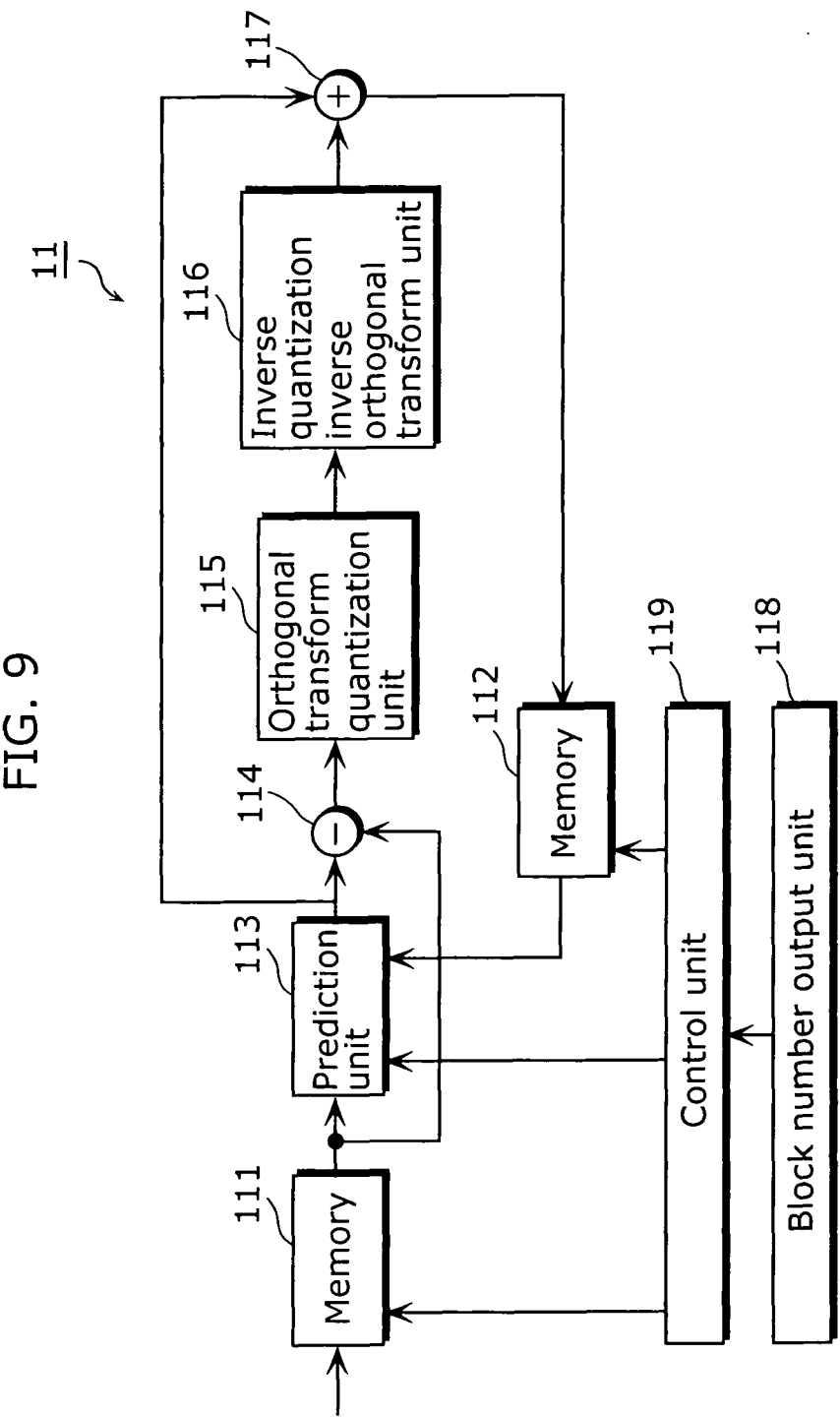
FIG. 9 is a block diagram showing the detailed functional configuration of the intra prediction apparatus 11 shown in FIG. 8.

FIG. 9 is a block diagram showing the detailed functional structure of the intra prediction apparatus 11 shown in FIG. 8.

As shown in FIG. 9, the intra prediction apparatus 11 includes the components of: a memory 111; a memory 112; a prediction unit 113; a subtractor 114; an orthogonal transform and quantization unit 115; an inverse quantization and inverse orthogonal transform unit 116; an adder 117; a block number output unit 118; and a control unit 119.

Figure 10B:
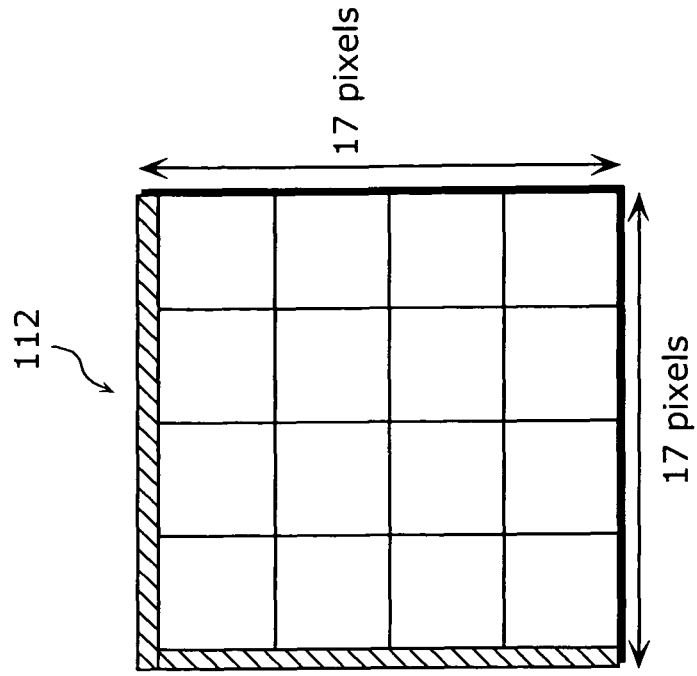
FIGS. 10A and 10B are schematic diagrams showing the structures of a memory 111 and a memory 112 respectively shown in FIG. 9.
Figure 10A:
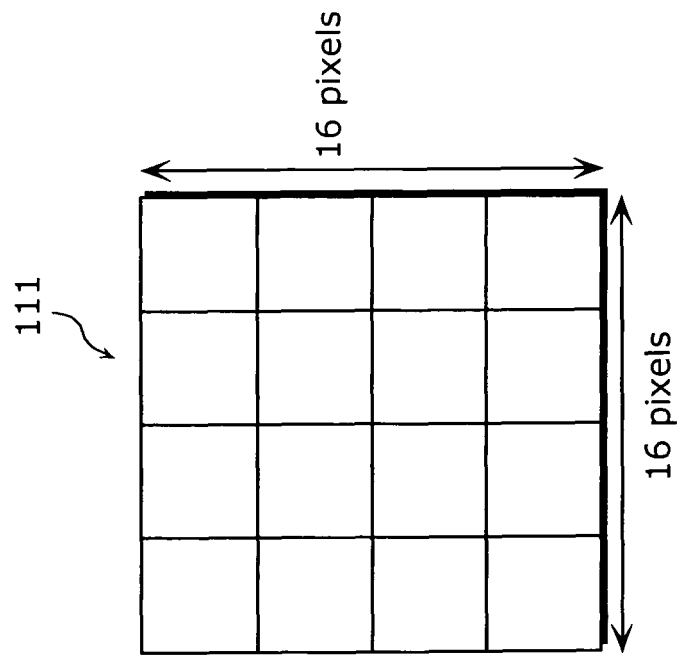

The memory 111 is intended for storing pixel values corresponding to a macroblock (vertical 16 pixels×horizontal 16 pixels) in an I picture which is an input signal. The memory 112 is intended for storing vertical 17 pixels×horizontal 17 pixels which means (a) the pixel values of vertical 16 pixels× horizontal 16 pixels for storing reproduced images or the like and (b) the pixel values of the coded pixels which are positioned immediately adjacent to the vertical 16 pixels×horizontal 16 pixels. In other words, at the time of starting the processing of the macroblock, the memory 112 is cleared first, and then the pixel value of the lower most line of the coded macroblock which is positioned immediately above the inputted macroblock is written in the first line. Further, the pixel value of the right most line of the coded macroblock which is positioned immediately left of the inputted macroblock is written in the first column. The schematic diagrams of the memories 111 and 112 will be shown in FIGS. 10A and 10B. Note that FIG. 10A shows the schematic structure of the memory 111, and FIG. 10B shows the schematic structure of the memory 112.

Figure 1:
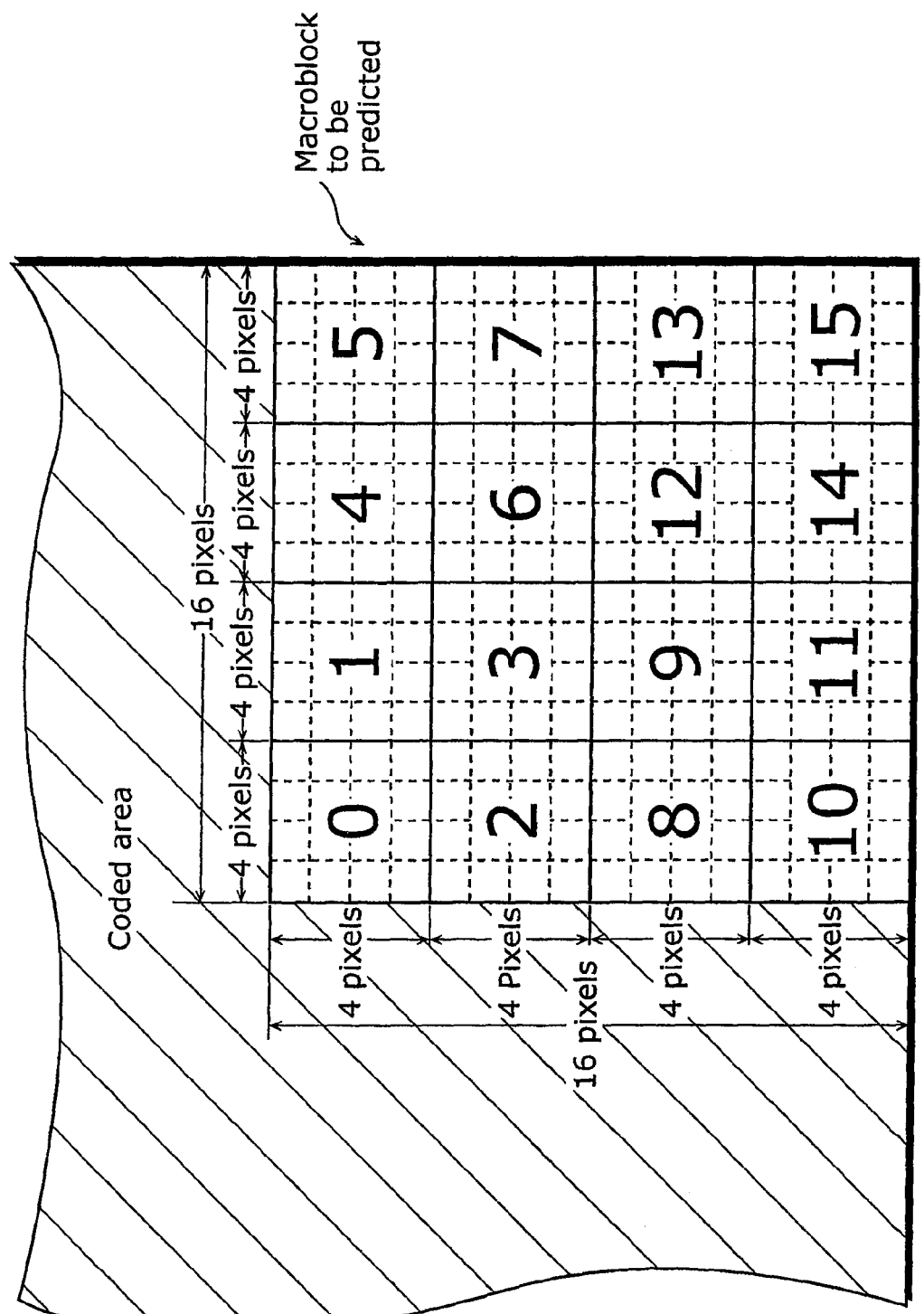
FIG. 1 is a diagram showing the relationship between a 16×16 macroblock in compliant to the Standard and the respective 4×4 pixel blocks.
Figure 3A:
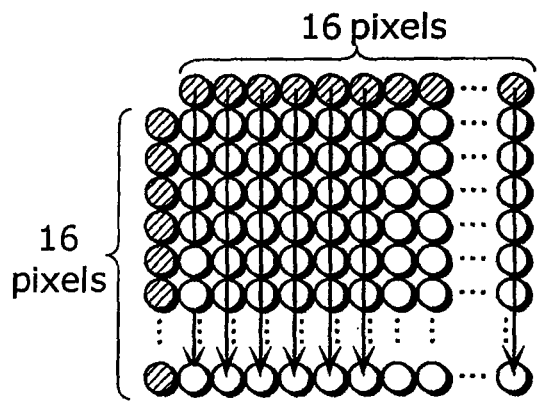
FIGS. 3A to 3D each is a diagram showing a prediction mode of the 16×16 macroblock.
Figure 3B:
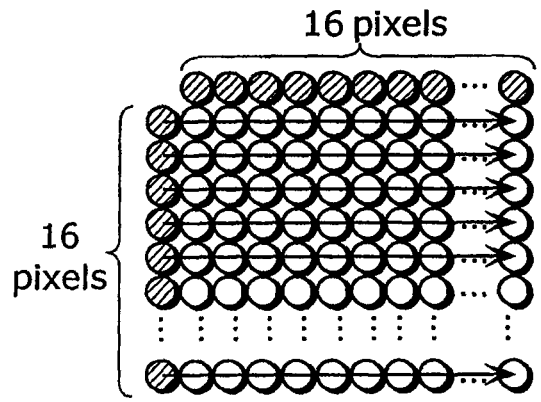
Figure 3C:
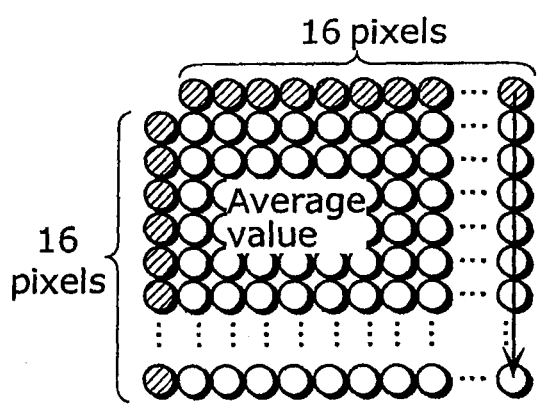
Figure 3D:
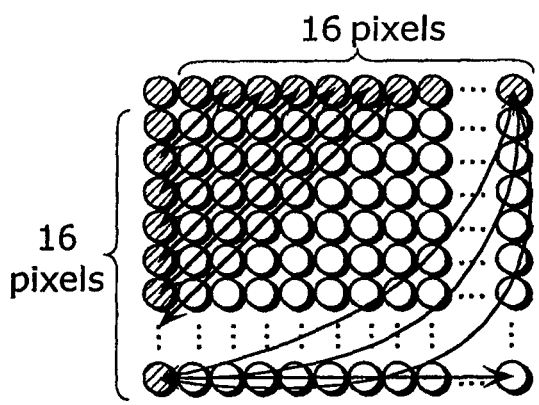

The block number output unit 118 outputs block numbers 0 to 15 shown in FIG. 1 in the ascending order, in other words, outputs the position information of the respective pixel blocks according to the Standard.

The control unit 119 outputs the address information for reading out the pixel values, in the block specified by a block number, from the memory 111. In addition, the control unit 119 outputs the address information for reading out the pixels which are positioned immediately left and above the block specified by the block number, from the memory 112. Further, the control unit 119 outputs the control signal S (later described).

In this way, the control unit 119 can cause the prediction unit 113 to perform in parallel, an intra prediction of 4×4 pixel blocks and an intra prediction of a 16×16 pixel macroblock in the ascending order of the block numbers shown in FIG. 1. The parallel execution used here is the concept indicating not simply a parallel execution but further a time sharing parallel execution.

FIG. 11 is a flow chart indicating the operation of the prediction performed by the prediction unit 113.

As to a macroblock which constitutes a picture (S11) and the respective 16 segments of blocks (S12), the prediction unit 113 performs in parallel intra predictions of the 4×4 blocks (S13) and an intra prediction of the 16×16 macroblock (S15).

Figure 4:
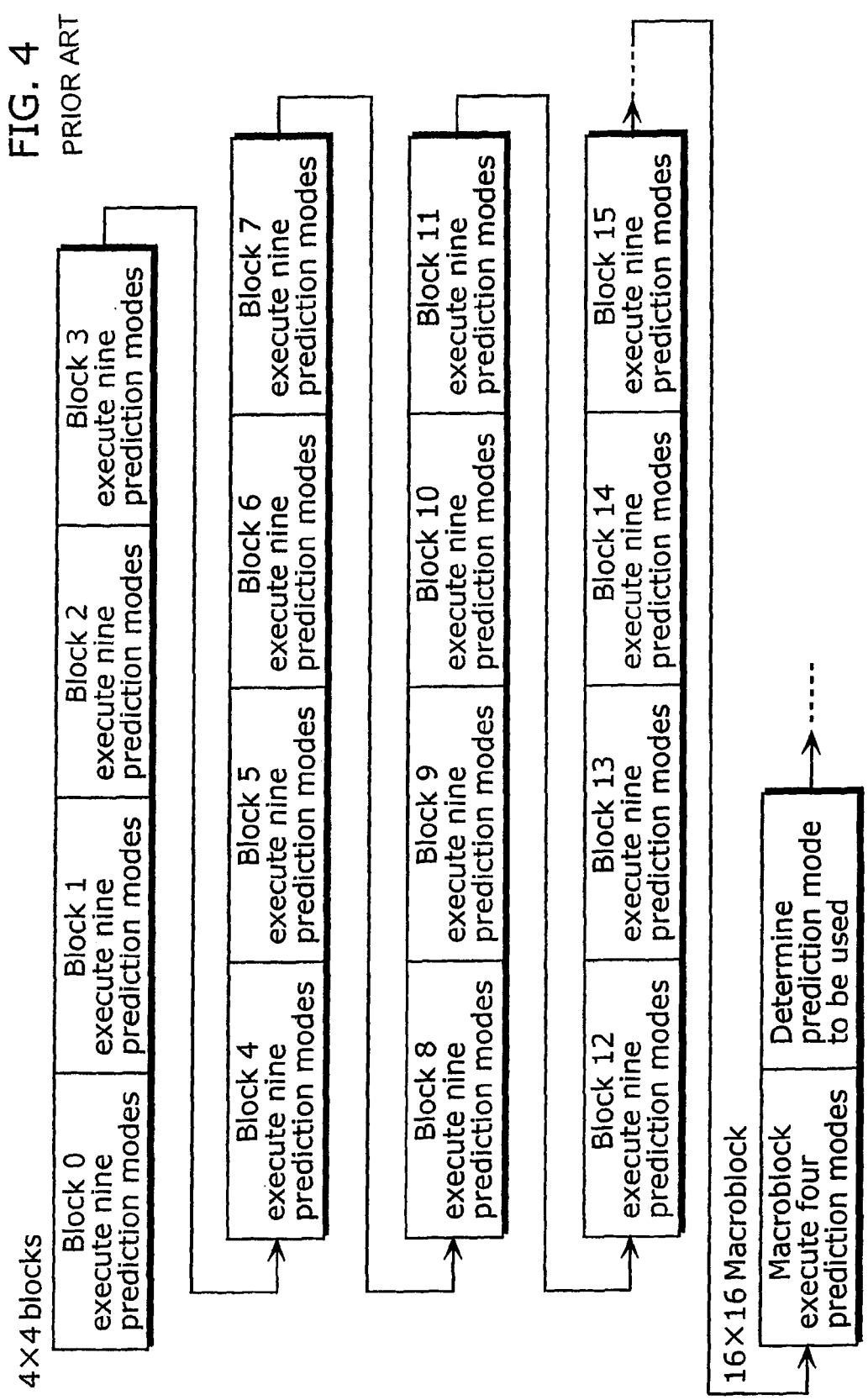
FIG. 4 is a sequence diagram showing conventional intra prediction processing in compliant to the Standard.
Figure 5A:
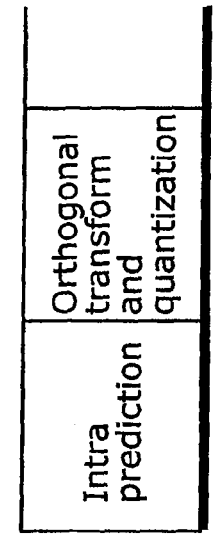
FIGS. 5A and 5B each is a diagram showing the details of the prediction processing in compliant to the Standard.
Figure 5B:
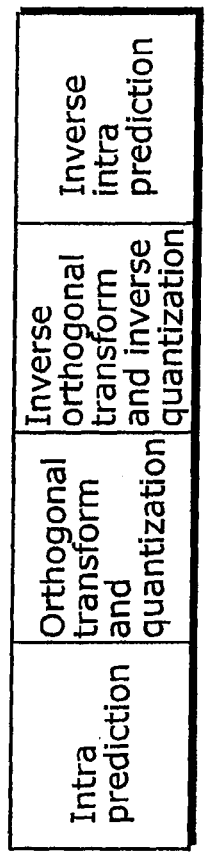
Figure 6:
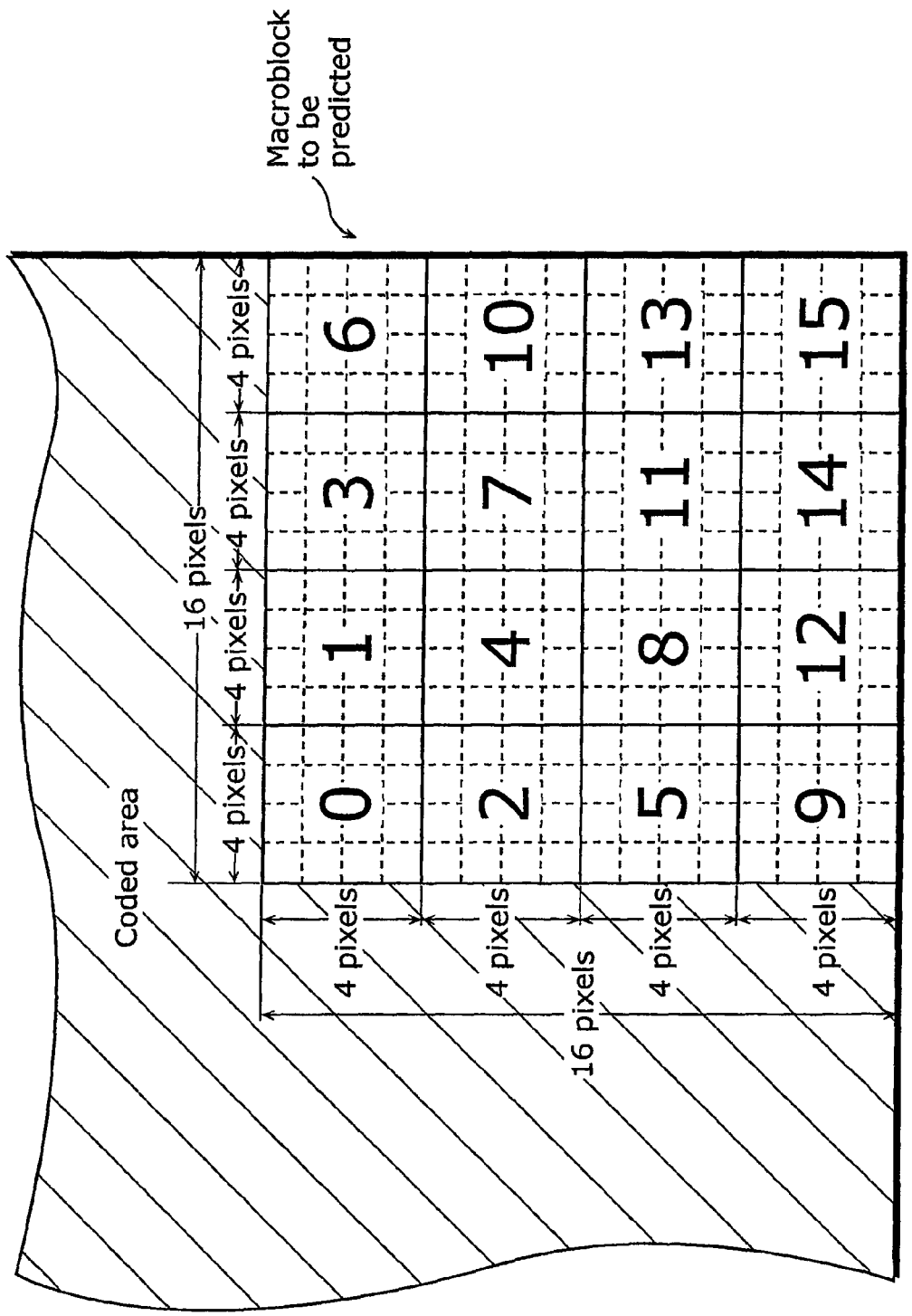
FIG. 6 is a diagram showing the relationship between the conventional 16×16 pixel macroblock disclosed in the publication and the respective 4×4 pixel blocks.
Figure 7:
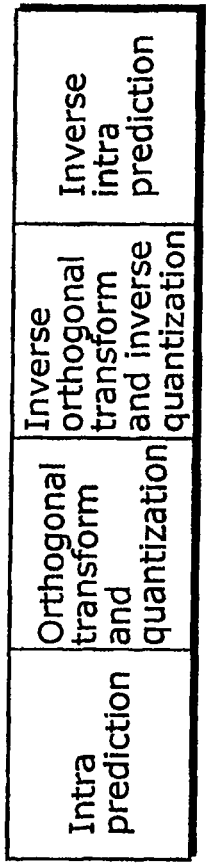
FIGS. 7A to 7C each is a sequence diagram of the conventional intra prediction processing disclosed in the publication.

After completing the intra predictions of all the blocks which are the 4×4 blocks and the 16×16 macroblock (S16), the prediction unit 113 completes intra predictions of the macroblock (S17). After that, as the result of performing the processing for determining a prediction mode which is the last process of the intra prediction processing shown in FIG. 4, the prediction unit 113 compares, the total of the SADs of the respective pixel blocks with the SAD of the macroblock and determines the smallest one as the intra prediction mode. In other words, in the case where the total of the SADs of the respective pixel blocks is the smallest, the intra prediction apparatus outputs the total of the SADs of the respective pixel blocks. In the other case where the SAD of the macroblock is the smallest, the intra prediction apparatus outputs the SAD of the macroblock. In this way, the data of I pictures are compressed. Note that it is possible to perform orthogonal transforms, or transforms into frequency components before calculate the SADs.

This parallel processing will be described in detail.

FIG. 12 shows the time relationship between (a) position information, address information and control signals S which are inputs in the control unit 119 and (b) a prediction processing. In other words, address information which is an output is generated twice for position information which is an input. In addition, as a control signal S, "0" and "1" are outputted by turns for each piece of position information. Here, as the address information to be outputted to the memory 112 at the time when the control signal S is "1", the address information for reading out the pixels which are positioned immediately left and above (the diagonally shaded areas in FIG. 10B) of the macroblock, irrespective of the position information.

Based on the address information outputted by the control unit 119, the pixel values of coded 4×4 blocks which are subjected to intra prediction are read out from the memory 111, and also, the neighbouring pixels for calculating the intra prediction pixels are read out from the memory 112 so as to be inputted to the prediction unit 113.

In the case where the control signal S is "0", the prediction unit 113 determines the prediction method which can provide best coding efficiency from among the nine prediction methods for 4×4 blocks, and calculates prediction pixels in the case of employing the best prediction method (As to the details of the prediction methods in 4×4 blocks and the 16×16 block, refer to Section 8.3 of the Standard or Chapter 5.1 of the TEXTBOOK.)

Here, it is possible to determine the best prediction method by, for example, calculating the prediction pixel values generated by the respective prediction methods and the SADs between the prediction pixel values and the pixel values to be coded on the basis of each prediction method so as to find the prediction method which can provide the smallest SAD among these SADs.

In addition, in the case where the control signal S is "1", the prediction unit 113 calculates the absolute differences between the pixels to be coded and the prediction pixels in the 4 types of prediction methods for performing intra predictions of the 16×16 blocks, and stores the absolute differences. After that, at the time of completing the processing of 16 pixel blocks of the 4×4 blocks, the prediction unit 113 may calculate the SADs of the respective pixel blocks on the basis of each prediction method, and then may output the prediction method which can provide the smallest SAD among these SADs as the best prediction method for intra prediction in the 16×16 blocks.

The subtractor 114 calculates the differences between prediction pixel values to be outputted by the prediction unit 113 and the pixel values to be coded which are to be outputted by the memory 111 on a pixel-by-pixel basis. The orthogonal transform and quantization unit 115 performs orthogonal transforms of the differences and then performs quantizations of the orthogonally transformed differences. The inverse quantization and inverse orthogonal transform unit 116 processes these results so as to generate difference pixel values which have been locally decoded. The adder 117 calculates, on a pixel-by-pixel basis, the sum between the prediction pixel values which are to be outputted by the prediction unit 113 and the pixel values to be coded. These sums are written in the memory 112.

These operations described up to this point are performed for each output of the block number output unit 118 shown in FIG. 12. This makes it possible to perform 4×4 intra predictions and 16×16 intra prediction in parallel.

With this configuration, 4×4 intra predictions and 16×16 intra prediction are performed by turns. As shown in FIG. 12, the inverse quantization and the inverse orthogonal transform of Block 1 have been finished and the local decoding results have already been recorded in the memory 112 before the 4×4 intra prediction of Block 2 is started. Thus, the 4×4 intra prediction of Block 2 can be started immediately. In this way, it becomes possible to realize a pipeline processing in which the followings are performed: (a) the prediction of the 16×16 block and (b) orthogonal transform and quantization processes, inverse quantization and inverse orthogonal transform processes, and inverse intra prediction process of the 4×4 pixel blocks according to the coding and decoding orders of the Standard. Further, since these processes are performed according to the coding and decoding orders of the Standard, the calculation results of the previous pixel blocks which are stored in the memory 112 can be used in the prediction of the following pixel blocks as they are. For this reason, no additional process or circuit for temporally storing the intermediate calculation results are needed.

Figure 13:
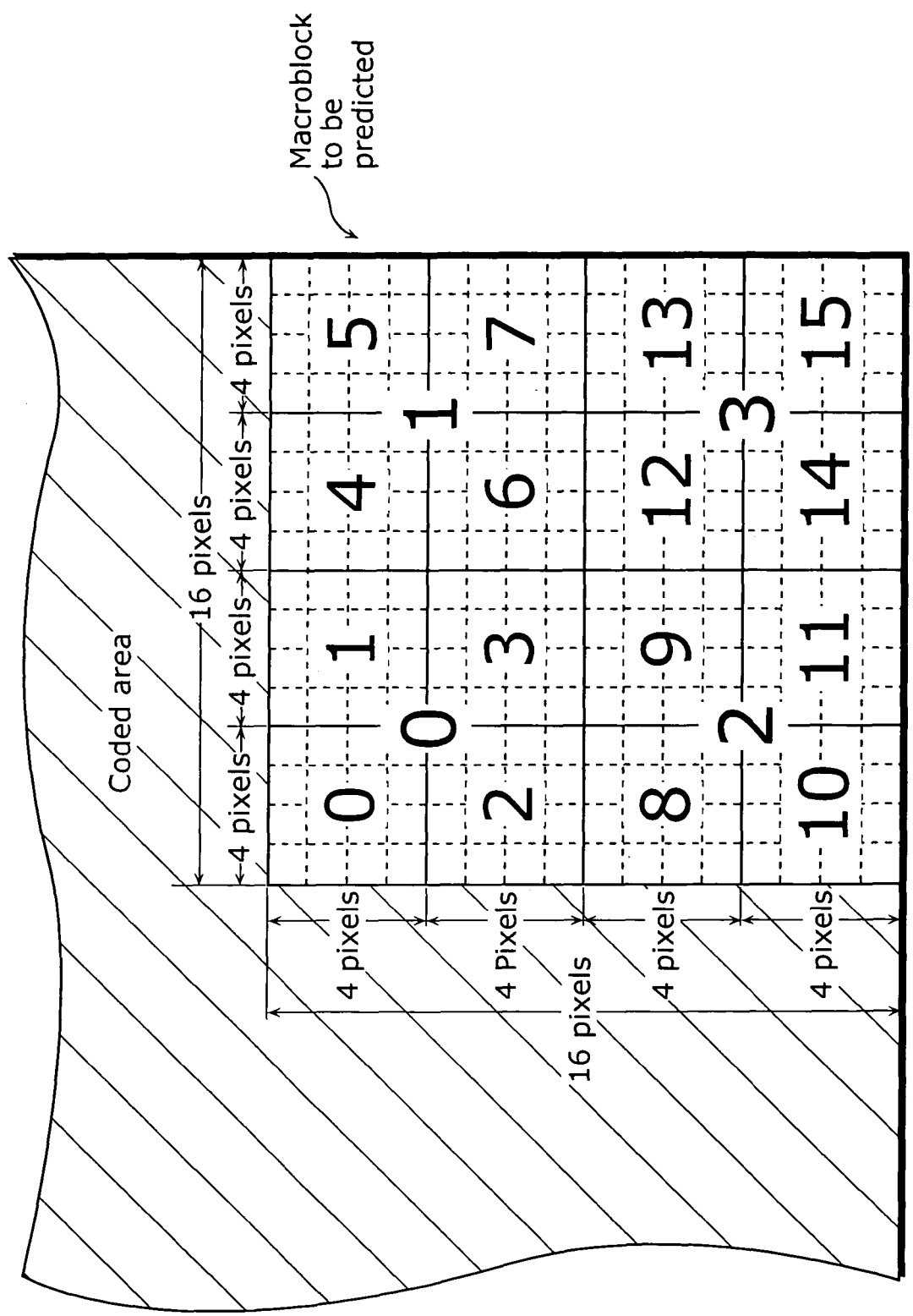
FIG. 13 is a diagram showing the relationship of 4×4 blocks, a 16×16 macroblock, and 8×8 blocks.

Note that, the case of performing intra predictions of 4×4 blocks and the 16×16 macroblock in parallel has been described in the embodiment, however, it is possible to perform (a) at least one of these processes and (b) intra predictions of 8×8 pixel blocks shown in FIG. 13 in parallel.

Figure 14:
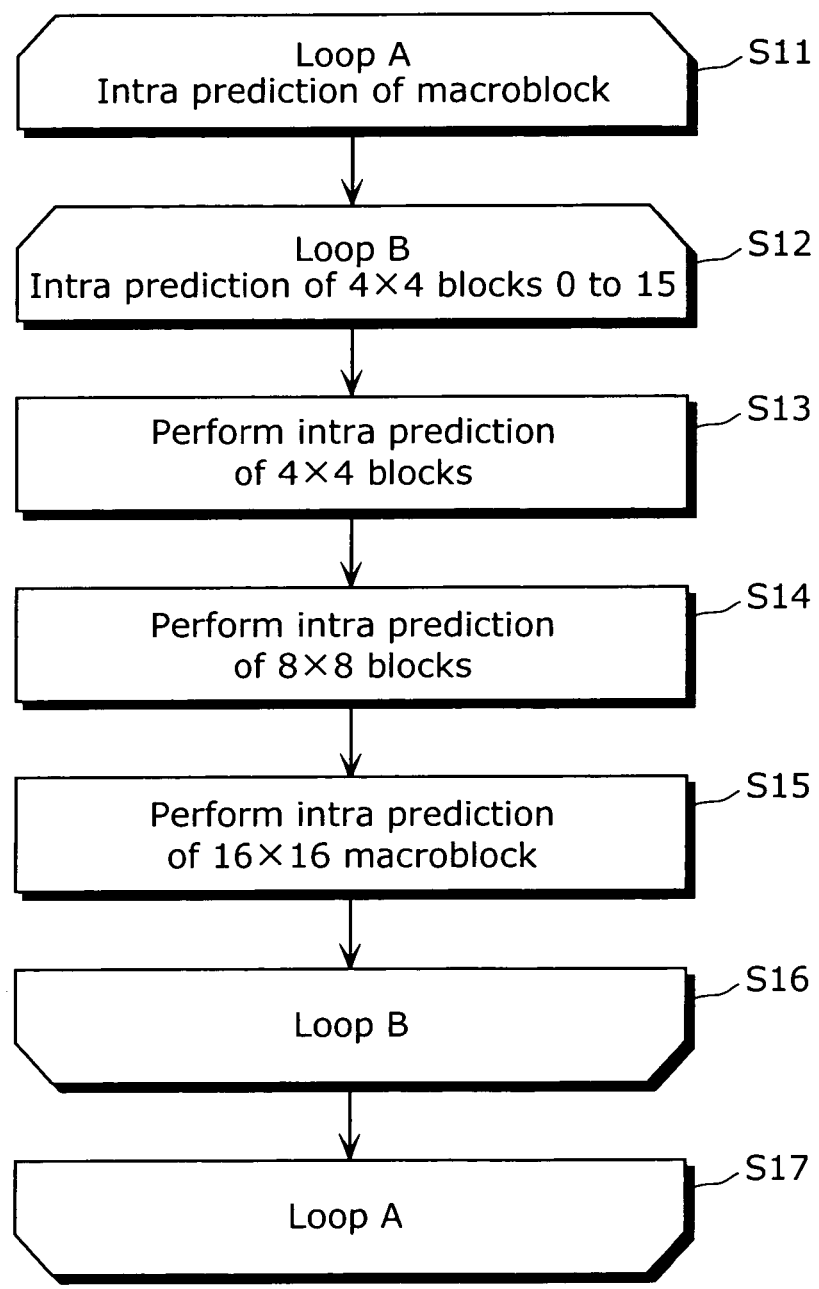
FIG. 14 is a flow chart showing the operation of another prediction process which is performed by the prediction unit 113.

In other words, as shown in FIG. 14, it is possible to perform the followings in parallel: intra predictions of 4×4 blocks (S13); intra prediction of the 8×8 blocks (S14); and intra prediction of the 16×16 macroblock (S15).

Figure 15:
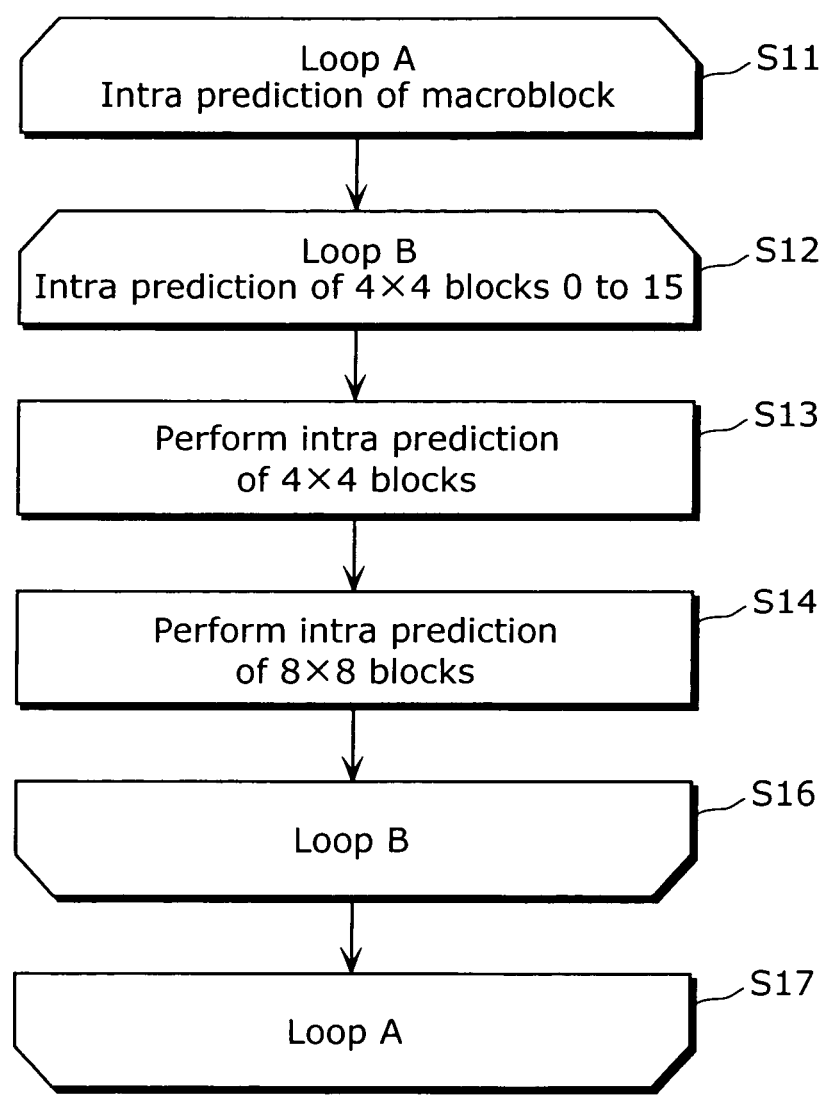
FIG. 15 is a flow chart showing the operation of another prediction process which is performed by the prediction unit 113.

In addition, as shown in FIG. 15, it is possible to perform in parallel the intra predictions of 4×4 blocks (S14) and the intra prediction of the 16×16 macroblock (S15).

Additionally, as shown in FIG. 16, it is possible to perform intra predictions of the 8×8 pixel blocks (S14); and intra prediction of the 16×16 macroblock (S15).

Properly performing these processes makes it possible to perform a highly efficient intra predictions corresponding to change rates of the pixel values of images to be coded.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

The present invention makes it possible to realize a pipeline execution of prediction processing resulting in improving the efficiency of intra predictions, orthogonal transforms, quantizations and the like. This enables to reduce the operation clock. This effect is especially remarkable in the case where the number of pixels per second of, for example, high vision images is improved. From this time forward, with the increase in the capacity of a storage medium (such as a DVD and a memory card), the importance of the function for taking high vision images of a home movie camera is also increased. It is important for a home movie camera to operate with a low electric power consumption. The present invention makes it possible to realize a movie camera which can be used for a long time duration controlling the increase in the operation clock and electric power consumption. Thus, the present invention is highly effective.

In addition, the present invention may be realized in a form of a CPU and a DSP.

Further, it is possible to prepare the present invention in a form of a program to be executed in a CPU and a DSP, transmit this through a network and a broadcasting circuit, and download it to an apparatus so as to execute it. In addition, the present invention is applicable not only to a personal computer, an HDD recorder, and a DVD recorder and the like but also to a video camera, a mobile phone with a camera and the like. Additionally, the present invention is applicable to a coding apparatus with this intra prediction apparatus.

What is claimed is:

1. An intra prediction apparatus for performing intra predictions of a picture, the apparatus comprising:
an intra prediction unit configured to perform the intra predictions of the picture according to (a) a first intra prediction mode for performing an intra prediction for each of first blocks obtained by dividing the picture, and (b) a second intra prediction mode for performing an intra prediction for each of second blocks obtained by dividing the first block; and
a control unit configured to cause said intra prediction unit to alternately perform, within the first block, (i) the intra prediction according to the second intra prediction mode on pixel values read out from a corresponding one of the second blocks, and (ii) a portion of the intra prediction according to the first intra prediction mode on the pixel values of the corresponding one of the second blocks which has already been subjected to the intra prediction (i), and to output predicted pixel values to a subtractor for calculating differences between the predicted pixel values with respect to the corresponding one of the second blocks and pixel values to be coded, wherein:

a control unit is configured to cause said intra prediction unit to perform sets of intra predictions for each of the first blocks,
each of the sets is composed of the intra prediction (i) and the intra prediction (ii),
the sets of intra predictions for each of the first blocks are sequentially performed in units of the second block and completed when the last set of the intra prediction according to the second intra prediction mode on the last second block and the intra prediction according to the first intra prediction mode on a part which is of the first block and corresponds to the last second block is completed, and
the portion of the intra prediction according to the first intra prediction mode is performed for each of the second blocks and a corresponding part of the first block.

2. The intra prediction apparatus according to claim 1, further comprising:
the subtractor;
an orthogonal transform and quantization unit configured to perform an orthogonal transform process and a quantization process of the differences between the predicted pixel values with regard to the corresponding one of the second blocks on which the second intra prediction has been performed and pixel values to be coded; and
an inverse quantization and inverse orthogonal transform unit configured to perform an inverse quantization and an inverse orthogonal transform process of the orthogonal transformed and quantized differences,
wherein, the orthogonal transform process, the quantization process, the inverse quantization process, and the inverse orthogonal transform process are performed during the portion of the intra prediction according to the first intra prediction mode is performed.

3. An intra prediction apparatus for performing intra predictions of a picture, the apparatus comprising:
an intra prediction unit configured to perform (a) a first intra prediction performing on a first-block, and (b) a second intra prediction performing on a second-block, the first-block including a plurality of second-blocks; and
a control unit configured to cause the intra prediction unit to:
perform, within the first-block,
(i) the second intra prediction with respect to a first second-block, and a first portion of the first intra prediction with respect to a first portion of the first-block, and then,
(ii) the second intra prediction with respect to a second second-block, and a second portion of the first intra prediction with respect to a second portion of the first-block, and
output predicted pixel values to a subtractor for calculating differences between the predicted pixel values and pixel values to be coded, wherein:
the first portion of the first-block corresponds to the first second-block, and the second portion of the first-block corresponds to the second second-block,
the control unit is further configured to cause said intra prediction unit to perform sets of intra predictions for each of first-blocks,
each of the sets is composed of the intra prediction (i) and the intra prediction (ii),
the sets of intra predictions for each of the first-blocks are sequentially performed and completed when the last set of the second intra prediction on the last second-block and the first intra prediction on a part which is of the first-block and corresponds to the last second-block is completed, and the first intra prediction is performed for each of second-blocks and a corresponding part of the first-block.

4. The intra prediction apparatus according to claim 3, further comprising:

the subtractor;

an orthogonal transform and quantization unit configured to perform an orthogonal transform process and a quantization process of differences between the predicted pixel values with regard to the second-block and pixel values to be coded; and an inverse quantization and inverse orthogonal transform unit configured to perform an inverse quantization and an inverse orthogonal transform process of the orthogonal transformed and quantized differences, wherein:

the orthogonal transform process, the quantization process, the inverse quantization process, and the inverse orthogonal transform process of differences between the predicted pixel values with regard to the first second-block and pixel values to be coded are performed during the first portion of the first intra prediction is performed, and the orthogonal transform process, the quantization process, the inverse quantization process, and the inverse orthogonal transform process of differences between the predicted pixel values with regard to the second second-block and pixel values to be coded are performed during the second portion of the first intra prediction is performed.

5. An intra prediction apparatus for performing intra predictions of a picture, the apparatus comprising:

an intra prediction unit configured to perform (a) a first intra prediction performing on a first-block, and (b) a second intra prediction performing on a second-block, the first-block including a plurality of second-blocks, and the first intra prediction including a plurality of portions of the first prediction; and a control unit configured to cause the intra prediction unit to perform, within the first-block, respective portions of the first prediction between performing the second intra predictions, wherein:

the intra prediction unit is further configured to output predicted pixel values to a subtractor for calculating differences between the predicted pixel values and pixel values to be coded, the control unit is further configured to cause said intra prediction unit to perform sets of intra predictions for each of first-blocks, in each of the sets, the respective portions of the first prediction within the first-bock are performed between performing the second intra predictions, the sets of intra predictions for each of the first-blocks are sequentially performed in units of the second-block and completed when the last set of the second intra prediction on the last second-block and the first intra prediction on a part which is of the first-block and corresponds to the last second-block is completed, and the portion of the first intra prediction is performed for each of the second-blocks and a corresponding part of the first-block.

6. The intra prediction apparatus according to claim 5, further comprising:

the subtractor;

an orthogonal transform and quantization unit configured to perform an orthogonal transform process and a quantization process of differences between the predicted pixel values with regard to the second-block and pixel values to be coded; and an inverse quantization and inverse orthogonal transform unit configured to perform an inverse quantization and an inverse orthogonal transform process of the orthogonal transformed and quantized differences, wherein, the orthogonal transform process, the quantization process, the inverse quantization, and the inverse orthogonal transform process are performed during one of the respective portions of the intra prediction is performed.

7. An intra prediction method for performing intra predictions of a picture, the method comprising a step of:

performing, by a processor, (a) a first intra prediction performing on a first-block, and (b) a second intra prediction performing on a second-block, the first-block including a plurality of second-blocks; and calculating differences between predicted pixel values obtained in the step of performing and pixel values to be coded, wherein:

during the step of performing,
(i) the second intra prediction with respect to a first second-block, and a first portion of the first intra prediction with respect to a first portion of the first-block, are performed; and then,
(ii) the second intra prediction with respect to a second second-block, and a second portion of the first intra prediction with respect to a second portion of the first-block, are performed, the first portion of the first-block corresponds to the first second-block, and the second portion of the first-block corresponds to the second second-block, sets of intra predictions for each of first-blocks are performed, each of the sets is composed of the intra prediction (i) and the intra prediction (ii), the sets of intra predictions for each of the first-blocks are sequentially performed and completed when the last set of the second intra prediction on the last second-block and the first intra prediction on a part which is of the first-block and corresponds to the last second-block is completed, and the first intra prediction is performed for each of second-blocks and a corresponding part of the first-block.

8. The intra prediction method according to claim 7, further comprising:

performing an orthogonal transform process and a quantization process of the differences between the predicted pixel values with regard to the second-block and pixel values to be coded; and performing an inverse quantization and an inverse orthogonal transform process of the orthogonal transformed and quantized differences, wherein:

the orthogonal transform process, the quantization process, the inverse quantization process, and the inverse orthogonal transform process of differences between the predicted pixel values with regard to the first second-block and pixel values to be coded are performed during the first portion of the first intra prediction is performed, and the orthogonal transform process, the quantization process, the inverse quantization process, and the inverse orthogonal transform process of difference between the predicted pixel values with regard to the second second-block and pixel values to be coded are performed during the second portion of the first intra prediction is performed.

9. An intra prediction method for performing intra predictions of a picture, the method comprising a step of:
performing, by a processor, (a) a first intra prediction of the picture performing on a first-block, and (b) a second intra prediction of the picture performing on a second-block, the first block including a plurality of second-blocks, the first intra prediction including a plurality of portions of the first prediction; and
calculating differences between predicted pixel values obtained in the step of performing and pixel values to be coded, wherein:
within the first block, respective portions of the first prediction are performed between performing the second intra predictions,
sets of intra predictions for each of first-blocks are performed,
in each of the sets, the respective portions of the first prediction within the first-bock are performed between performing the second intra predictions,
the sets of intra predictions for each of the first-blocks are sequentially performed in units of the second-block and completed when the last set of the second intra prediction on the last second-block and the first intra prediction on a part which is of the first-block and corresponds to the last second-block is completed, and
the portion of the first intra prediction is performed for each of the second-blocks and a corresponding part of the first-block.

10. The intra prediction method according to claim 9, further comprising:
performing an orthogonal transform process and a quantization process of the differences between the predicted pixel values with regard to the second-block and pixel values to be coded; and
performing an inverse quantization and an inverse orthogonal transform process of the orthogonal transformed and quantized differences,
wherein, the orthogonal transform process, the quantization process, the inverse quantization, and the inverse orthogonal transform process are performed during one of the respective portions of the intra prediction is performed.

* * * * *